(12) United States Patent
Ford et al.

(10) Patent No.: US 6,923,463 B1
(45) Date of Patent: Aug. 2, 2005

(54) TRAILER HITCH ALIGNMENT DEVICE

(76) Inventors: Jordan Ford, 816 SE. 16th Pl., Deerfield Beach, FL (US) 33441; John Clifford Page, 5970 NW. 104th La., Parkland, FL (US) 33076

( * ) Notice: Subject to any disclaimer, the term of this patent is extended or adjusted under 35 U.S.C. 154(b) by 29 days.

(21) Appl. No.: 10/751,989

(22) Filed: Jan. 7, 2004

(51) Int. Cl.$^7$ ................................................ B60D 1/36
(52) U.S. Cl. ....................... 280/477; 359/844; 248/479
(58) Field of Search ........................ 280/477; 359/842; 248/479, 481, 484, 486, 487

(56) References Cited

U.S. PATENT DOCUMENTS

| | | | |
|---|---|---|---|
| 3,295,914 A | 1/1967 | Dietrich | |
| 5,180,182 A | 1/1993 | Haworth | |
| 5,309,289 A | 5/1994 | Johnson | |
| 6,076,847 A * | 6/2000 | Thornton | 280/477 |
| 6,213,608 B1 * | 4/2001 | Osgood | 359/841 |
| 6,239,926 B1 * | 5/2001 | De Shazer | 359/841 |
| 6,357,126 B1 * | 3/2002 | Gillen, Jr. | 33/264 |
| 6,409,200 B1 | 6/2002 | Glass | |
| 6,422,585 B1 | 7/2002 | Glass | |
| 6,499,851 B1 * | 12/2002 | Kelly et al. | 359/850 |

* cited by examiner

*Primary Examiner*—Kevin Hurley
(74) *Attorney, Agent, or Firm*—C. J. Husar, Esq.

(57) ABSTRACT

The invention allows the alignment of a towing vehicle to a trailer tongue bringing the towing vehicle into close alignment with the tongue thus permitting the tongue to be lowered onto the hitch ball to complete the connection. This alignment can be accomplished exclusively by the driver of the towing vehicle without outside assistance. The alignment device includes a telescopic mast that includes a mirror with a ball and socket connection for aligning the mirror to the tongue of the trailer. The alignment device includes a pair of mounting plates that have a plurality of mounting holes to allow the mounting to several different sized trailer tongues, namely, a four inch, six inch and an eight inch tongue. Once the connection of the tongue to the ball is made, the alignment device remains in the position set for future use.

9 Claims, 3 Drawing Sheets

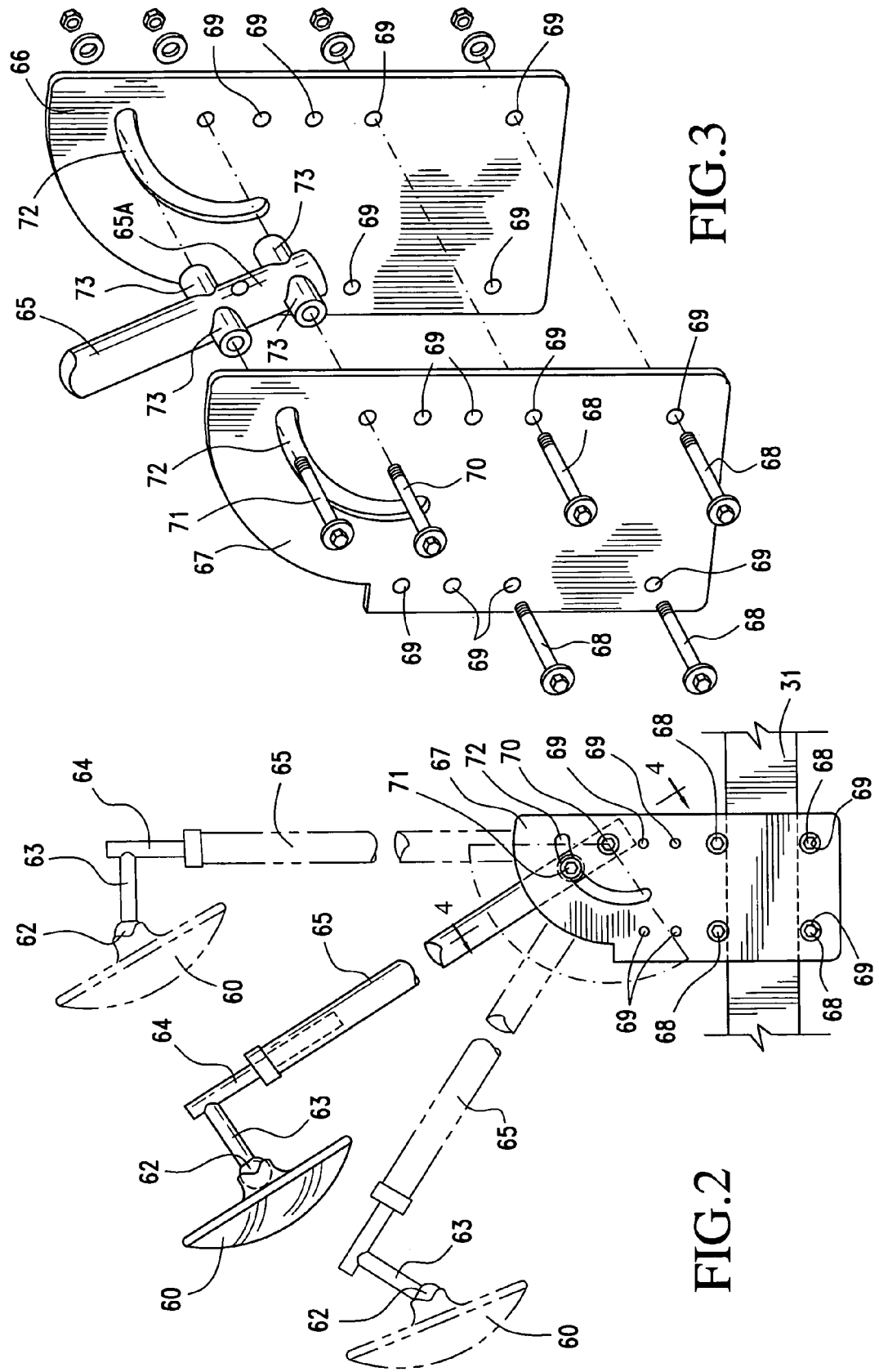

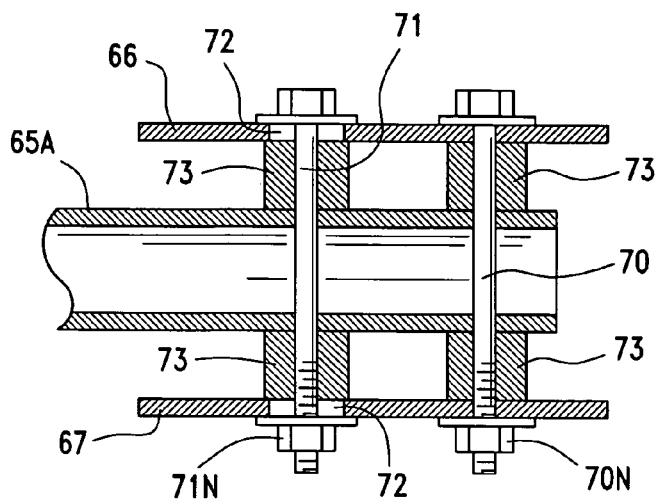
FIG.4
FIG.5
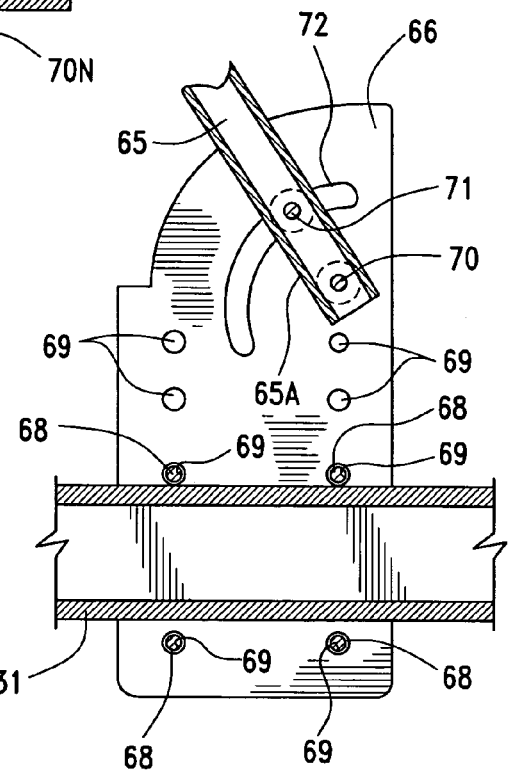
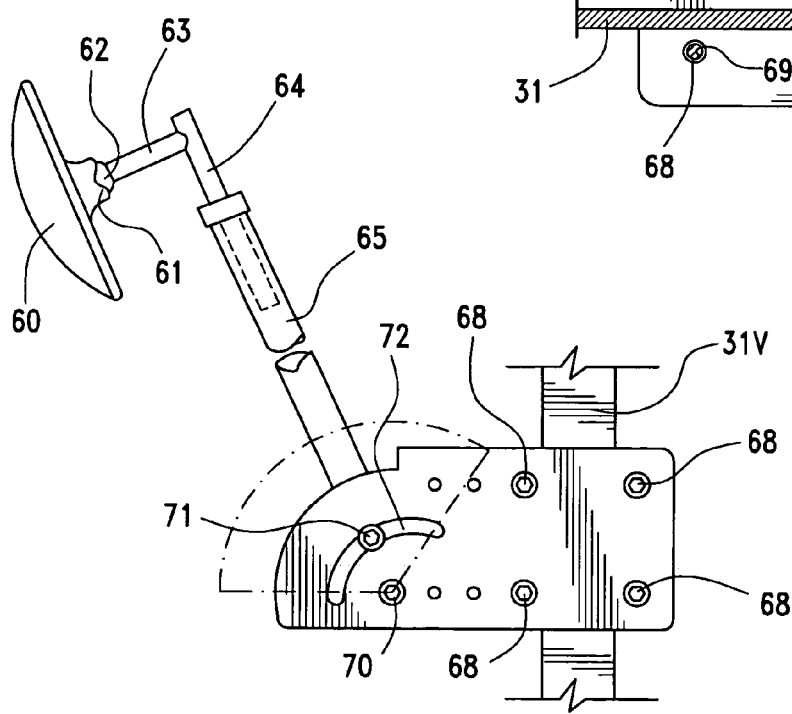
FIG.6

TRAILER HITCH ALIGNMENT DEVICE

BACKGROUND OF THE INVENTION

The present invention relates to a trailer hitch alignment device and more specifically, it relates to a convex mirror and supporting structure that is permanently attached to the trailer frame to view the connection process of the trailer tongue and the trailer tow ball. With today's mobile society, constantly on the go, camping trips, boating trips, etc. it is not uncommon to see the family SUV chugging down the highway with a trailer in tow carrying the family boat, camping equipment, etc. off for a week-end of fun. For everyone of these enjoyable sights, there more than likely, has been a period of aggravation and frustration experienced by the driver of that particular vehicle. The aggravation and frustration is brought about in the process of aligning and attachment of the trailer to the towing vehicle. In many instances, a member of the family assists in the alignment procedure which may also include a flag mounted on a mast in the vicinity of the trailer tongue to give the driver of the vehicle a visual approximation as to where the hitch is located and also the helpful hand signals of the oldest family member to guide the driver in the backing-up.

In view of the above noted problems, applicants have designed a uniquely supported mirror system that is permanently attached to any one of many trailer components. The main mounting support includes a pair of spaced support plates that are bolted to a trailer portion and are provided with a pivot axis and an arcuate-slot portion that receives a bolt that passes through said pair of spacers that straddle a portion at the lowermost end of a telescopic member and a plurality of locking nuts to lock the telescopic arm in its desired position. The opposite end of the telescopic member includes a right-angled member with a ball joint at its free end for receiving an adjustable convex mirror.

DISCUSSION OF THE PRIOR ART

A recent search of the Patent Office files in the appropriate Classes and subclasses revealed the following prior art documents.

U.S. Pat. No. 3,295,914—issued to W. Dietrich on Jan. 3, 1967—discloses a mirror arrangement mounted on a vertical jack housing of a trailer tongue.

U.S. Pat. No. 5,180,182—issued to J. R. Haworth on Jan. 19, 1993—discloses a mirror arrangement mounted to the top of a pick-up tailgate.

U.S. Pat. No. 5,309,289—issued to B. G. Johnson on May 3, 1994—discloses a mirror arrangement mounted to a jackstand and structural housing of cylindrical configuration on base frame 19.

U.S. Pat. No. 6,076,847—issued to M. E. Thornton on Jun. 20, 2000—discloses a post 12 mounted to an upper flat surface of tongue 108 on trailer 100 for supporting mirror 30 above hitch component 110.

U.S. Pat. No. 6,213,608—issued to A. G. Osgood on Apr. 10, 2001—discloses mast vertical section 73 that has a mast bottom horizontal section 72 that is inserted into hitch attachment tube 51 from which it can be pivoted thereabout.

U.S. Pat. No. 6,239,926—issued to R. F. De Shazer on May 29, 2001—discloses an extensible mirror mounted offset to the center of tongue 24.

U.S. Pat. Nos. 6,409,200 and 6,422,585—issued to J. L. Glass on Jun. 25 and Jul. 23, 2002, respectively—disclose mirrors that are telescopically mounted tubular member that is attached to a vehicle by magnets or suction cups U.S. Pat. No. 6,499,851—issued to Kelly et al on Dec. 31, 2002—discloses a telescopic mirror mounted to a trailer frame 18 by means of a magnet. The telescopic tube includes flexible gooseneck neck to allow for mirror adjustment.

As one will note by a review of the above cited prior art, none of these patents disclose applicant's unique two plate arrangement with an arcuate groove therein for receiving the lowermost end of the telescopic mirror mast and locking nuts of the mirror mast to lock the mast in its desired position relative to the ball socket portion of the hitch. As pointed out above, these plates and their associated sets of mounting bolt holes allow for connections to plurality of different sized trailer tongues/components.

SUMMARY OF THE INVENTION

In view of the above noted problems associated with hooking-up a trailer to a towing vehicle and the deficiencies of the prior art, applicants have developed the subject invention which allows the alignment of a towing vehicle to a trailer tongue bringing the towing vehicle into close alignment with the tongue thus permitting the tongue to be lowered onto the hitch ball to complete the connection. As indicated earlier, this alignment can be accomplished exclusively by the driver of the towing vehicle without outside assistance. The alignment device is permanently mounted and set for the trailer ball to the subject trailer alignment and stays in place and adjusted for that particular vehicle and subject trailer. Once in its locked position, it is free and clear of all moving truck and/or trailer parts.

OBJECTS OF THE INVENTION

An object of the invention is to provide a trailer hitch alignment device that is easy to install and can be located on a plurality of locations of a trailer frame.

A further object of the invention is to provide a trailer hitch alignment device that can be mounted on many different locations and various sized trailers.

Another object of the invention is to provide a trailer hitch alignment device that includes a telescopic support for the mirror.

A still further object of the invention is to provide a trailer hitch alignment device that includes a pair of spaced mounting plates with a ninety-degree arc cut-out portion to guide the mirror as it is adjustably supported therein.

A further object of the invention is to provide a trailer hitch alignment device that includes a plastic convex mirror.

Another object of the invention is to provide a trailer hitch alignment device that includes a permanently attached mirror support system.

Another object of the invention is to provide a mirror, which is located directly over the trailer tongue, this allows the driver to see and target the precise point the vehicle needs to be aligned to in order to connect the ball to the tow hitch.

These and other objects of the invention will become more apparent hereinafter. The instant invention will now be described with reference to the accompanying drawings wherein like reference characters designate the corresponding parts throughout the several views.

BRIEF DESCRIPTION OF THE DRAWINGS

FIG. 2 is a perspective of the trailer hitch alignment device per se, with mirror shown in several alternative positions.

FIG. 3 is an exploded view of the mounting plates and the lowermost end of the mirror mast before its assembly.

FIG. 4 is a sectional view taken along the plane 4—4 of FIG. 2 illustrating the lowermost end of the mirror mast and its securement to the support plates.

FIG. 5 is a partial sectional view illustrating the adjustment holes for alternative mounting to different sized trailer frames.

FIG. 6 is an illustration of the hitch mirror and its mounting plate showing its range of arcuate adjustment while mounted in a vertical position.

DETAILED DESCRIPTION OF THE DRAWINGS

Figure 1:
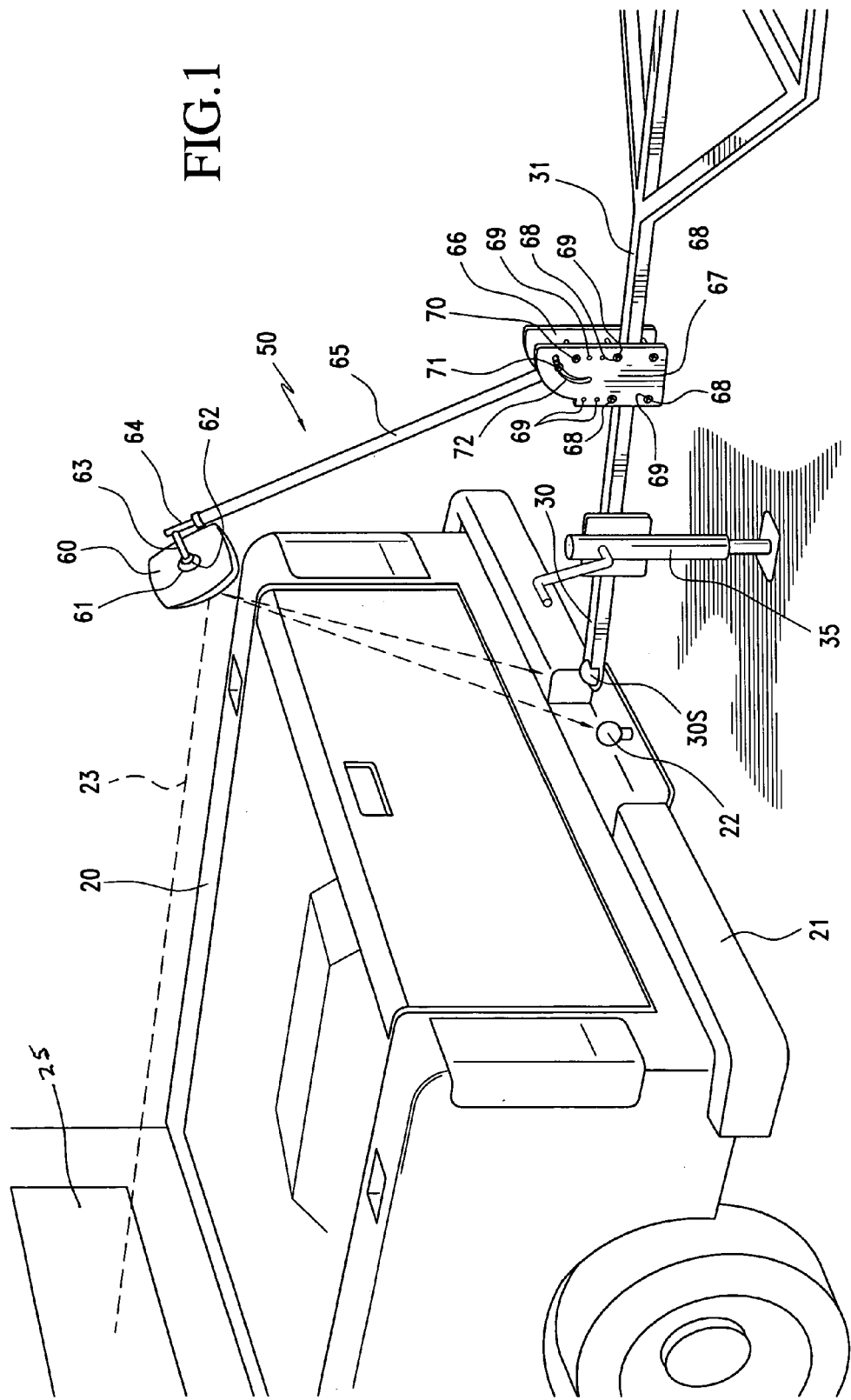
FIG. 1 is an overall illustration of a hitch ball mounted on a vehicle bumper with a trailer tongue supporting the novel trailer hitch alignment device in preparation for attaching the tongue to the hitching ball.

Referring now to FIG. 1, there is shown the rear end of a pick-up truck 20 and its rear bumper 21 with a trailer hitch ball 22 mounted thereon. As shown, there is a line of sight 23 from the rear view mirror (not shown) within the cab of the truck, or by looking directly through the rear window 25 to the hitch alignment mirror 60 which is adjusted to permit simultaneous viewing of the hitch ball 22 and the forward end 30 and hitch socket 30S of the trailer tongue 31 therebeneath. The forward end 30 of trailer tongue 31 is shown supported by a conventional trailer tongue jack 35 that is operably mounted to trailer tongue 31.

Hitch alignment assembly 50 includes a convex mirror 60 that is adjustably mounted at the upper end of a telescopic mast portion 64 that extends from stationary mast portion 65. Attached to telescopic mast portion 64 is a short member 63 that includes a ball 62 that is received in socket 61 allowing adjustment of mirror 60. The lowermost end 65A of stationary mast portion 65 is adjustably mounted between a pair of spaced adjustment plates 66, 67 that are secured to trailer tongue 31 by a plurality of mounting bolts 68. As illustrated, bolts 68 are inserted into the four lowermost adjustment holes 69 for attaching adjustment plates 66,67 to trailer tongue 31, which in this instance is a four inch tongue. The upper four bolt holes 69 would be used as necessary for securement of plates 66, 67 to tongues of larger dimensions than tongue 31, i.e. the next two upper holes 69, 69 with the bottom two holes 69, 69 can accommodate a six inch trailer tongue and the two uppermost bolt holes 69, 69 are used in conjunction with the two lowermost bolts holes 69, 69 to accommodate an eight inch trailer tongue. Pivot bolt 70 serves as the pivot point for telescopic mast 65 while locking bolt 71 serves as the locking means for locking mast 65 in its particular angular position relative to arcuate slot 72.

Although truck 20 is shown rather close to hitch socket 30S, in actuality, hitch ball 22 and hitch socket 30S come into view of mirror 60 when the truck bumper 21 is approximately four–five feet away from hitch socket 30S.

Referring now to FIG. 2, there is shown a side view of the telescopic mast 65 and the convex mirror 60 in a plurality of available positions with convex mirror 60 positioned at various angles relative to mast 65 through ball 62 and socket 61. As indicated earlier, the four lowest mounting holes 69 are utilized to mount mast 65 to tongue 31 while the four additional mounting bolt holes 69 can be used as needed to accommodate mounting supports other than tongue 31 which may be of increased thickness relative to tongue 31.

FIG. 3 is an exploded view of the mounting plates 66, 67 separated to illustrate the lowermost end 65A of mast 65. As shown, the lowermost end 65A includes a plurality of spacers 73, with four spacers 73 on opposite sides of lowermost end 65A for receiving locking bolt 71 and pivot bolt 70, respectively.

FIG. 4 is a sectional view taken along the plane 4—4 of FIG. 2 illustrating the arrangement of spacers 73 relative to the lowermost end 65A of mast 65 and support plates 66, 67 and pivot bolt 70 and locking bolt 71. In adjusting mirror 60, mast 65 is moved to the desired location and then pivot bolt 70 is secured by tightening nut 70N followed by securing locking bolt 71 in place by tightening locking nut 71N.

FIG. 5 is a sectional view illustrating the securement of the plate 66 and lowermost end 65A of mast 65 to trailer tongue 31 with the additional adjustment bolt holes 69 available for subsequent use with a support member having larger dimensions than tongue 31. More specifically, the four bottom holes 69 are shown in use with a four-inch trailer tongue. The next two upper holes 69 and the two lowest holes 69 are for use with a six-inch and the two uppermost holes 69 and the two lowermost holes are for use with an eight-inch trailer tongue.

FIG. 6 is a side view similar to the showing of FIG. 2. However, in this view, support plates 66, 67 are shown mounted to a vertical support member 31V as opposed to the horizontal support member trailer tongue 31 shown in the other views. This vertical support member 31V could be a bow catcher. The range of motion of mast 65 is shown in dashed lines.

While the invention has been described in its preferred embodiment, it is to be understood that the words which have been used are words of description rather than words of limitation and that changes may be made within the purview of the appended claims without departing from the full scope or spirit of the invention. Accordingly, the present invention is to be limited only by the appended claims, and not by the foregoing specification.

Having thus described our invention, We claim:

1. A trailer hitch alignment device for attachment to a trailer having a hitch socket thereon for receiving a hitch ball that is mounted on a rear bumper of a towing vehicle, said trailer hitch alignment device comprising:
   mounting means for securing said hitch alignment device in any one of several locations on a trailer structure;
   said mounting means for securing said hitch alignment device in any one of several locations on a trailer structure comprises a plurality of spaced plate means for adjustably supporting said mirror means;
   support means adjustably supported by a mounting means; and
   mirror means operably connected to said support means whereby a person looking into said mirror means of said trailer hitch alignment device can successfully align a hitch ball that is mounted on a vehicle's rear bumper with the hitch socket of a trailer hitch when mounted on the tongue of a trailer without the need of additional assistance.

2. A trailer hitch alignment device of the type defined in claim 1 wherein said plurality of spaced plate means includes two parallel plates with several groups of aligned mounting holes thus allowing said two parallel plates to be mounted on any one of three different sized trailer tongues.

3. A trailer hitch alignment device of the type defined in claim 2 wherein said three different sized trailer tongues are four inches, six inches and eight inches.

4. A trailer hitch alignment device of the type defined in claim 3 wherein all the components of said trailer hitch alignment device are made of anodized aluminum to resist oxidation in salty environments.

5. A trailer hitch alignment device of the type defined in claim 2 wherein each of said two parallel plates includes an arcuate slot for guiding said locking bolt and a pivot point bolt for allowing pivotal movement of said support means and locking said support means in its desired position with said locking bolt means.

6. A trailer hitch alignment device of the type defined in claim 2 wherein said support means comprises a telescopic mast having a lower end that is positioned between said two parallel plates and secured therebetween for pivotal movement about said pivot bolt and locked in position by said locking bolt.

7. A trailer hitch alignment device of the type defined in claim 6 wherein said lower end of said telescopic mast includes a plurality of spacers positioned on opposite sides of said pivot bolt and said locking bolt, with said locking bolt extending through a pair of guiding arcuate slots in said pair of parallel plates.

8. A trailer hitch alignment device of the type defined in claim 1 wherein said mirror means comprises a convex mirror.

9. A trailer hitch alignment device of the type defined in claim 8 wherein said convex mirror is made of plastic.

* * * * *